Patented Jan. 16, 1923.

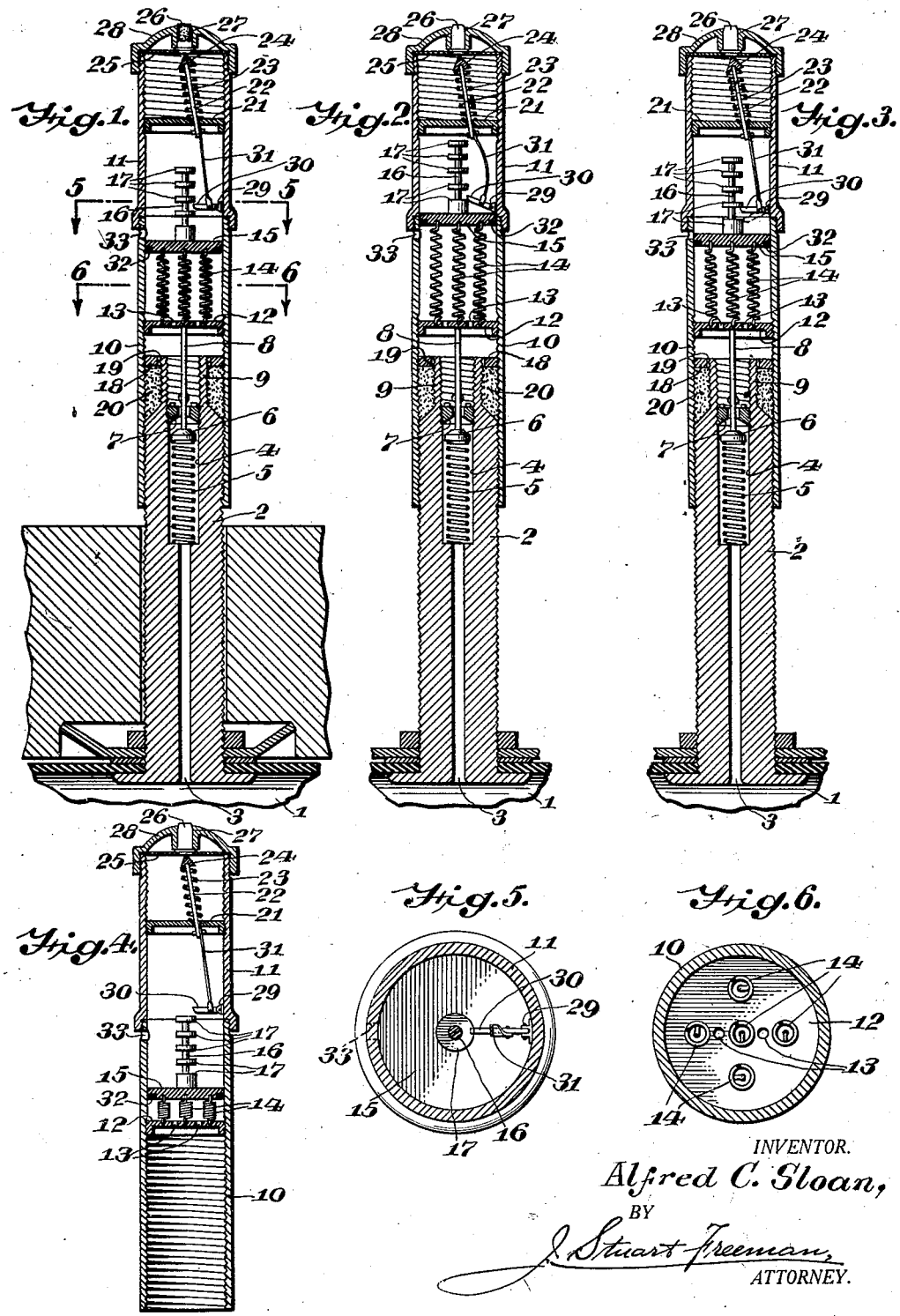

1,442,182

UNITED STATES PATENT OFFICE.

ALFRED C. SLOAN, OF PHILADELPHIA, PENNSYLVANIA.

SAFETY AND SIGNALING DEVICE FOR PNEUMATIC TIRES.

Application filed March 2, 1920. Serial No. 362,729.

*To all whom it may concern:*

Be it known that I, ALFRED C. SLOAN, a citizen of the United States, residing at Philadelphia, in the county of Philadelphia and State of Pennsylvania, have invented certain new and useful Improvements in Safety and Signaling Devices for Pneumatic Tires, of which the following is a specification.

The object of this invention is to provide an improved signal to be used in conjunction with pneumatic tires for automobiles, bicycles, or other types of vehicles, for the purpose of giving an audible warning of the deflation of a tire equipped with the device, before the air necessary to prevent a wheel's flange from cutting the tire has decreased below a given predetermined pressure.

A further object is to provide such a device with details of construction adapted to permit the escape of air automatically from a tire, when the pressure therein reaches a point at a predetermined number of pounds above that at which the said tire is normally designed to operate.

And a still further object is to provide a device of this character comprising a casing, means co-operating with and operative to maintain the valve of a pneumatic tire in open position, resiliently positioned means within said casing to normally prevent the escape of air from the said valve, but adapted to permit air to escape through an orifice provided for the purpose in the said casing when the air within the tire reaches an abnormal pressure, an alarm which preferably comprises a blank cartridge, a firing member, and means operative to release the said firing means by engagement with and upon the movement in one direction of said resiliently positioned means.

With these and further objects and details of construction in view, the present invention comprises certain novel details of construction and operation which are fully described in the following specification when read in conjunction with the accompanying drawings, in which Fig. 1 is a longitudinal diametrical section through the preferred embodiment of the device showing the working elements in normal positions when associated with the usual valve of a tire; Fig. 2 is a similar view showing the position of the elements when permitting air to escape therefrom; Fig. 3 is a similar view showing the elements after their return to their normal positions practically as in Fig. 1; Fig. 4 is a similar view of the improved device per se; Fig. 5 is a horizontal section on the line 5—5 of Fig. 1; and Fig. 6 is a view similar to Fig. 5, but taken on the line 6—6 of Fig. 1.

Referring to the drawings, there is shown a portion 1 of the usual pneumatic tire, to which is secured the usual valve casing 2, provided with a central axially extending orifice 3 enlarged at its outer end portion 4 to provide a recess for any suitable type of spring 5, which is operative to normally position the valve 6 against a seat 7, having a central aperture through which extends the usual valve stem 8, the said valve casing being provided in the usual manner with external threads preferably throughout its entire length, and at its free end reduced and externally threaded at 9, said reduced end portion being generally provided with a removable cap (not shown).

The present invention is adapted to be screwed into firm operative position surrounding the outer portion of the valve casing 2, and comprises an internally threaded cylindrical member 10; to the outer end of which is secured an extension 11 in the form of a hollow cylindrical member, which in turn is internally threaded for any desired distance inwardly from its outermost free end. Screwed in position within the inner end portion of the member 10 is a partition 12 provided with one or more apertures 13, and to the outer face of which member there is adapted to be secured one or a plurality of contraction springs 14, which at their respective outer free ends are secured to a slidable partition 15, which upon its outer face is provided centrally with a stem 16 having spaced annular flanges 17.

Within the inner end portion of the member 10 there is also screwed a partition 18 provided with a central aperture 19, adapted to surround the reduced end portion 9 of the valve casing, while further surrounding said reduced end portion and confined longitudinally between the partition 19 in one direction and the large portion of the valve casing 2 in the other, there is positioned suitable air-tight packing 20, to prevent the escape of air thereby and towards the inner end of the casing section 10.

Screwed into a normally fixed position within the free end portion of the member 11 is a partition 21, provided with an aperture, through which extends preferably in a diagonal direction a firing-pin 22, surrounded by a coil-spring 23, and provided upon its outer end with a head 24, adapted when said pin is released to project through a centrally disposed aperture within a gasket or washer 25 and explode a preferably blank-cartridge 26, fixedly retained in position by said gasket within a centrally disposed aperture 27 in a cap 28, which is adapted to be screwed in fixed position upon the outermost portion of the cylindrical member 11.

Preferably pivotally secured at 29 to one side of the inner wall of the member 11 is a small lever or trigger 30, to which is secured a transversely resilient member 31, which at its outer end is secured directly to the firing-pin 22. Said trigger is adapted to co-operate with any one of the several flanges 17 upon the stem 16, depending upon the extent to which the partition 15 is forced outwardly against the tension of the spring or springs 14 by the air pressure within a tire equipped with the device, the distance in the positions of any two adjacent flanges being by prearrangement representative of any given number of pounds pressure.

In the operation of this device, the same is screwed into firm position upon the usual valve casing 2, after a tire has been inflated to the desired pressure for which said tire is designed, in which position the partition 12 presses inwardly upon the stem 8, thus bringing the air pressure within the tire to bear upon the inner surface of the partition 15, from which the air cannot leak because of the annular packing 32, thus forcing the last-named partition into such a position as that shown in Fig. 1. If, however, more air has been forced into the tire than the improved device is said to accommodate, or if the pressure within the tire increases substantially as the result of a long period of running during hot weather, the partition 15 moves outwardly until the dangers created by the excess pressure is relieved by some of the air escaping outwardly through the aperture 33, as for instance in the position of the partition shown in Fig. 2, after which said partition returns approximately to the position shown in Fig. 3.

On the other hand, if there is encountered a leak or puncture and the air pressure within the tire passes to a point considerably below the normal operating pressure, the same permits the springs 14 to withdraw the slidable partition 15 into such innermost position as to permit one of the flanges 17 to trip the trigger 30, and upon releasing the latter permitting the spring 23 to operate the firing-pin and head carried thereby to explode the signal cartridge 26. Having received this warning, all that is necessary is to remove the cap 28 and insert a new cartridge, and by removing the device as a unit from the valve casing 2 to restore the air pressure within the tire to that at which it is designed to normally operate.

Having thus described my invention, what I claim and desire to protect by Letters Patent of the United States is:—

1. An automatic signal device for pneumatic tires, comprising a shell adapted to be secured to the valve casing, means to open the valve, a resiliently positioned partition directly affected by air pressure from within the tire through the valve, a cartridge, spring-pressed means to explode said cartridge, a shoulder carried by said partition, and means released by said shoulder upon a movement of said partition operative to permit said spring-pressed means to explode said cartridge.

2. The combination of a pneumatic tire valve with a removable shell, means within said shell to maintain said valve opened, a slidable partition movable in accordance with changes in the air pressure within the tire, a spring actuated firing-pin, a shoulder carried by said partition, and means adapted to be released by said shoulder to permit said pin to explode a cartridge carried by said shell.

3. The combination of a pneumatic tire valve with a removable shell, a perforated fixed partition within said shell operative to maintain said valve in open position, a movable partition, resilient means to position said latter partition with said first partition, and an aperture in said shell to permit the escape of air when excessive pressure passing through said valve from said tire forces the movable partition past said aperture.

4. The combination of a pneumatic tire valve with a removable shell, a perforated fixed partition within said shell operative to maintain said valve in open position, a movable partition, resilient means to position said latter partition with said first partition, an aperture in said shell to permit the escape of air when excessive pressure passing through said valve from said tire forces the movable partition past said aperture, a spring-pressed firing pin, a shoulder carried by said movable partition, and means operative to be released by said shoulder to permit said pin to explode a cartridge carried by said shell.

In testimony whereof I have affixed my signature.

ALFRED C. SLOAN.

In the presence of—
JULIAN I. GIFFORD,
THEODORE ROSEMANN.